United States Patent [19]

Horna

[11] Patent Number: 4,609,787
[45] Date of Patent: Sep. 2, 1986

[54] ECHO CANCELLER WITH EXTENDED FREQUENCY RANGE

[75] Inventor: Otakar A. Horna, Bethesda, Md.

[73] Assignee: Communications Satellite Corporation, Washington, D.C.

[21] Appl. No.: 612,159

[22] Filed: May 21, 1984

[51] Int. Cl.$^4$ .............................................. H04B 3/20
[52] U.S. Cl. ................................................... 179/170.2
[58] Field of Search ................ 179/170.2, 170.6, 170.8

[56] References Cited

U.S. PATENT DOCUMENTS

| | | | |
|---|---|---|---|
| 3,754,105 | 8/1973 | Poschenrieder et al. | 179/170.2 |
| 3,894,200 | 7/1985 | Campanella et al. | 179/170.2 |
| 3,900,708 | 8/1975 | Bendel | 179/170.2 |
| 3,941,948 | 3/1976 | Brooks | 179/170 R |
| 3,946,170 | 3/1976 | Brooks | 179/170 R |
| 4,005,277 | 1/1977 | Araseki et al. | 179/170.2 |
| 4,360,712 | 11/1982 | Horna | 179/170.2 |

FOREIGN PATENT DOCUMENTS 0003430  1/1983  Japan .............................. 179/170.2

OTHER PUBLICATIONS

COMSAT Technical Review "Cancellation of Acoustic Feedback", vol. 12, No. 2, pp. 319-333, 1982, O. Horna.
COMSAT Technical Review "Analysis of an Adaptive Impulse Response Echo Canceller, vol. 2, No. 1, pp. 1-38, Campanella, Suyderhead & Orufry.
COMSAT Technical Review "Echo Canceller with Adaptive Transversal Filter Utilizing Pseudo-Logarithmic Coding", vol. 7, No. 2, pp. 393-428, 1977, O. A. Horna.

Primary Examiner—Gene Z. Rubinson
Assistant Examiner—R. Vaas
Attorney, Agent, or Firm—Sughrue, Mion, Zinn, Macpeak, and Seas

[57] ABSTRACT

An echo canceller with extended frequency range for acoustic echoes comprising an adaptive finite impulse response filter receiving the receive signal below a cross-over frequency and predicting the echo of this signal across the echo path, a subtractor for subtracting the predicted echo form the send signal below the cross-over frequency, and an adder for combining the low frequency output of the adder with the send signal above the cross-over frequency to form the send signal to be transmitted.

14 Claims, 5 Drawing Figures

ECHO CANCELLER WITH EXTENDED FREQUENCY RANGE

BACKGROUND OF THE INVENTION

The invention relates generally to echo cancellers and relates, in particular, to echo cancellers having a wide frequency range.

Echo cancellers are well known in the telephone and communication industries for cancelling echoes created at an electronic junction between receiving and transmitting lines on one side and another set of communication lines on the other side. In practice, the transmitting line is incompletely isolated from the receiving line so that part of the received signal is unintentionally coupled into the transmitting line. The result is perceived as an echo of the received signal on the transmitting line. An example of an echo canceller is an adaptive finite impulse response filter (AFIRF) described by the present inventor in a technical article entitled "Echo Canceller with Adaptive Transversal Filter Utilizing Pseudo-logarithmic Coding" appearing in Comsat Technical Review, Volume 7, Fall 1977 at pages 393–428. The AFIRF is also disclosed in U.S. Pat. No. 4,064,379 to the present inventor.

The AFIRF is a digital filter and is represented schmatically in FIG. 1. The signals are received on a receive line 10 and transmitted on a send line 12. A hybrid 14 both receives and transmits signals and if perfectly operating would completely separate the two signals. However, typically there exists an echo path from the receive line 10 to the send output 16 of the hybrid 14. In order to cancel this echo, an AFIRF 18 is coupled between the receive ends and the lines 10 and 12. An analog-to-digital converter 20 samples the receive line at a rate R, converts the analog signal to digital form, delays it in a delay line 21, and sends the corresponding digital signal through a switch 22 to a shift register 24, called the X register. The delay line 21 emulates the delay of the echo path. The X register contains n+1 shift locations. The X register 24 operates at a rate of nR and its output is fed back to its input through the switch 22. The switch 22 switches between its two positions so that the one sample of oldest information in the X register 24 is shifted out and lost on each complete recirculation and is replaced by a sample of freshly received data from the A/D converter 20.

Another n+1-long shift register 26, called the H register, contains a digital representation of the response of the echo path to an impulse signal. The H register 26 is also operated at the rate of nR and its output is fed back through circuitry, to be described later, to its input. The outputs of the X register 24 and H register 26 are multplied together in a multiplier 28. The outputs of the multiplier 28 are summed by an accumulator 29 over each recirculation or sampling period and then converted to an analog form. As a result, the signal on the receive line 10 is convolved with the impulse response of the echo path to produce a predicted echo on the output of the accumulator 29. This predicted echo on the output of the accumulator 29 is connected to an inverting input of an adder 30. The output 16 of the hybrid 14 is connected to a non-inverting input of the adder 30. As a result, the predicted echo is subtracted from the transmitted signal and the output of the adder 30 should contain an echo-free transmitted signal.

If it is assumed for the purposes of this present discussion that no signal is being intentionally transmitted, then the output of the adder 30 should be zero. A non-zero output of the adder 30 when no signal is being intentionally transmitted indicates that the H register 26 contains an improper impulse response of the echo path. The output of the adder 30 is led to a correction processor 32 as an error signal which the correction processor 32 uses to correct the values of the coefficients being stored in the H register 26. Another stage 34, actually a part of the register 26, is used for the correct recirculation timing in the H register 26. An optional center-clipper 36 can be used to attenuate the low level components of the output of the adder 30 in order to suppress a residual echo that has not been otherwise cancelled. The center-clipper 36 does not significantly affect the higher level signals intended for transmission.

The inventor has described in a technical article entitled "Cancellation of Accoustic Feedback" appearing in Comsat Technical Review, Volume 12, Fall 1982, pg. 319–333, the use of an echo canceller, such as that shown in FIG. 1, to cancel echoes in a room. Room echoes become a particular problem for teleconferencing in which, as illustrated in FIG. 2, a loudspeaker 40 and a microphone 42 are positioned within room 44. An incoming signal is broadcast by the loudspeaker 40 so that all the people 46, 48 and 50 in the room 44 can hear. Any one of the participants 46–50 in the teleconference can talk. A microphone amplifier 52 connected to the microphone 42 is given sufficient gain so that an audible signal is transmitted regardless of the position of the speaker relative to the microphone 42. The problem is that the microphone 42 also picks up the signal from the loudspeaker 40, resulting in an echo.

The echo can be cancelled by an echo canceller 56 of the same form as that shown in FIG. 1. However, as described in the cited reference, an echo canceller used for an acoustic echo in a room should have different parameters from that used for echo cancelling in a normal telephone line. A teleconferencing network is expected to have a greater bandwidth than a normal telephone line, e.g., 5.2 kHz versus 3.3 kHz. Although the average speech levels above 5.5 kHz is more than 26 dB below that at 750 Hz, these higher frequencies contribute substantially to the intelligibility and clarity of the voice signal. Thus it is desirable to extend the channel bandwidth even further to 7.5 kHz for a "commentator quality" channel. Also, the typical reverberation time for a room 44, that is, the time for a sound within a room to damp out, it considerably longer than the time constants associated with telephone sets and other electronic equipment. Room reverberation times are high because of the low sound velocity, which is approximately 1 foot per millisecond. The echo canceller 56 must be able to adequately emulate the response of the echo path over both its bandwidth and reverberation time.

A processing window is defined by the maximum length of the impulse response that an echo canceller can emulate. A 15 kHz sampling rate R is the minimum or Nyquist rate for a 7.5 kHz channel. The processing window is given by n/R where n+1 is the length of the X and H registers 24 and 26. With present technology and available hardware, the number n of coefficients or the length of the registers 24 and 26 has a practical limit of approximately 1000 because of the so called processing noise (i.e. accumulation of round-off, quantization and sampling errors). This limitation is analyzed by Campanella in a technical article entitled "Analysis of an Adaptive Impulse Response Echo Canceller", appearing in Comsat Technical Review, Volume 2, Spring 1972, at pages 1–38. This limitation is not raised when using series-parallel organization for the convolution processor as described in U.S. Pat. No. 4,377,793. With a value of n=1000, the maximum processing window for a commentator quality channel is 66.5 ms. The reverberation time of a room is usually measured in terms of the time $T_{60}$ that is required for a signal to damp out by 60 dB. For 20 dB cancellation of the echo, the processing window must be at least one third of $T_{60}$. This means that the reverberation time $T_{60}$ can be no larger than 220 ms. This condition is often not satisfied for typical rooms.

Thus with prior art techniques and practical technology, either bandwidth or complete echo cancellation must be sacrificed. One approach for obtaining acoustic echo cancellation of a commentator quality channel is to rely upon the power density spectrum of the typical speech which is illustrated in FIG. 3. Curve 60 given the human threshold of audibility for continuous spectra sound. Three generally parallel curves 62, 64 and 66 give the levels of speech minimums, the average level of speech and the level of speech peaks, respectively, as a function of frequency. Thus it is seen that higher frequency components of speech are at a relatively low level. Nonetheless, they must be retained and some form of echo cancellation provided. The technique that relies upon the human speech spectrum provides digital echo cancelling only for the lower frequency components, that is, the sampling rate is relatively low so that 1000 coefficients provides a relatively long processing window. As a result, the high frequency components of the echo are incompletely cancelled. However, FIG. 3 indicates that the high frequency echo is of relatively low level. The center-clipper 36, shown in FIG. 1, is used to remove the residual echo, particularly the high frequency echo which the digital AFIRF 18 does not remove. In order to remove the distortion that the center-clipper 36 would introduce into transmitted speech, a double-talk detector is used to detect when a signal is being intentionally transmitted on the send line 16. The double-talk detector linearizes the response of the center-clipper 36. While a linearized center-clipper 36 does not attenuate the high frequency components of simultaneous echo, these high frequency components are of sufficiently low level compared to the transmit signal that they are not noticeable. That is, the high frequency components of the echo are masked by the transmitted signal.

It should be noted that Brooks in two U.S. Pat. Nos. 3,941,948 and 3,946,170 discloses systems involving center-clipping of one of two bands of a transmission signal and that Bendel in U.S. Pat. No. 3,900,708 discloses separately suppressing echoes in different bands. However the present invention differs in that the more accurate but complex echo cancelling is performed on a low frequency band while echo suppression is performed on the high-frequency band which typically has a substantially lower signal level.

A further problem with a full-bandwidth AFIRF is that the levels of the high frequency components are so small that they approach the quantization noise of eight bit processing whether A-law or U-law quantization of the analog signal is used. The spectral distribution of the speech can effectively be changed by preemphasis or de-emphasis which improves the quantization resolution at the higher frequencies. However, these techniques, besides conflicting with the use of a center-clipper, cannot completely solve the problem of a limited precision of quantization at speech frequencies above 3.5 kHz.

SUMMARY OF THE INVENTION

Accordingly it is an object of this invention to provide an echo canceller with high bandwidth.

It is another object of this invention to provide an echo canceller with a long processing window.

It is further object of this invention to provide an echo canceller for cancelling acoustic feedback in a room.

Yet a further object of this invention is to provide high bandwidth with a voice echo canceller using small bit length digital filters.

The invention can be summarized as an echo canceller that separates out the low frequency components of the received and transmitted signals. The echo of the low frequency receive signal is predicted and subtracted from the low frequency transmitted signal. The high frequency transmitted signal is passed through a phase adjusting filter. Both the high frequency transmitted signal and the echo-cancelled low frequency signal are passed through non-linear center-clipping circuits which are disabled or linearized by a double-talk detector. The outputs of the center-clipping circuits are recombined to form the output of the echo canceller.

DETAILED DESCRIPTION OF THE PREFERRED EMBODIMENTS

Figure 2:
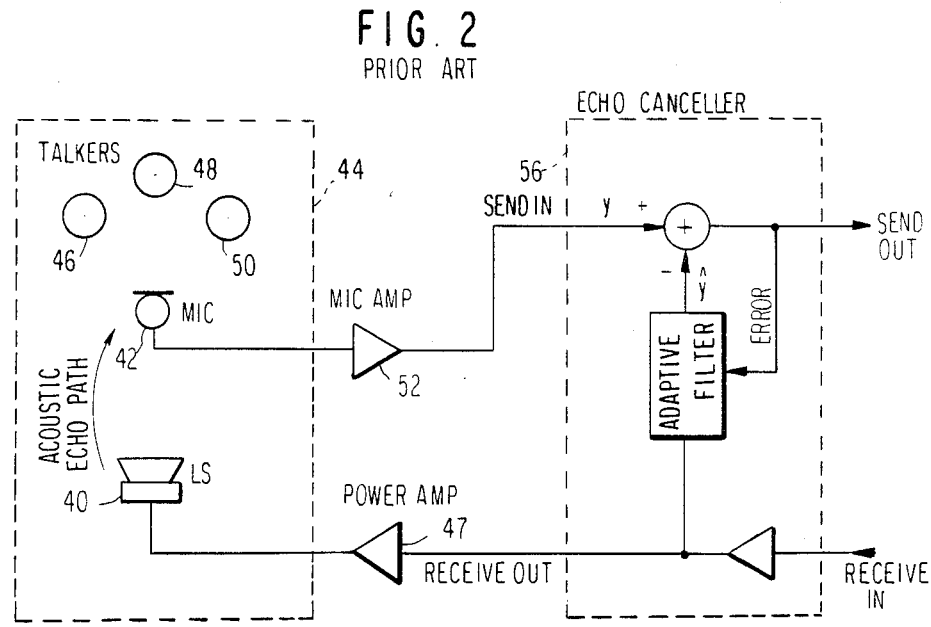
FIG. 2 is a block diagram of a conventional echo canceller for use with a teleconferencing circuit.
Figure 4:
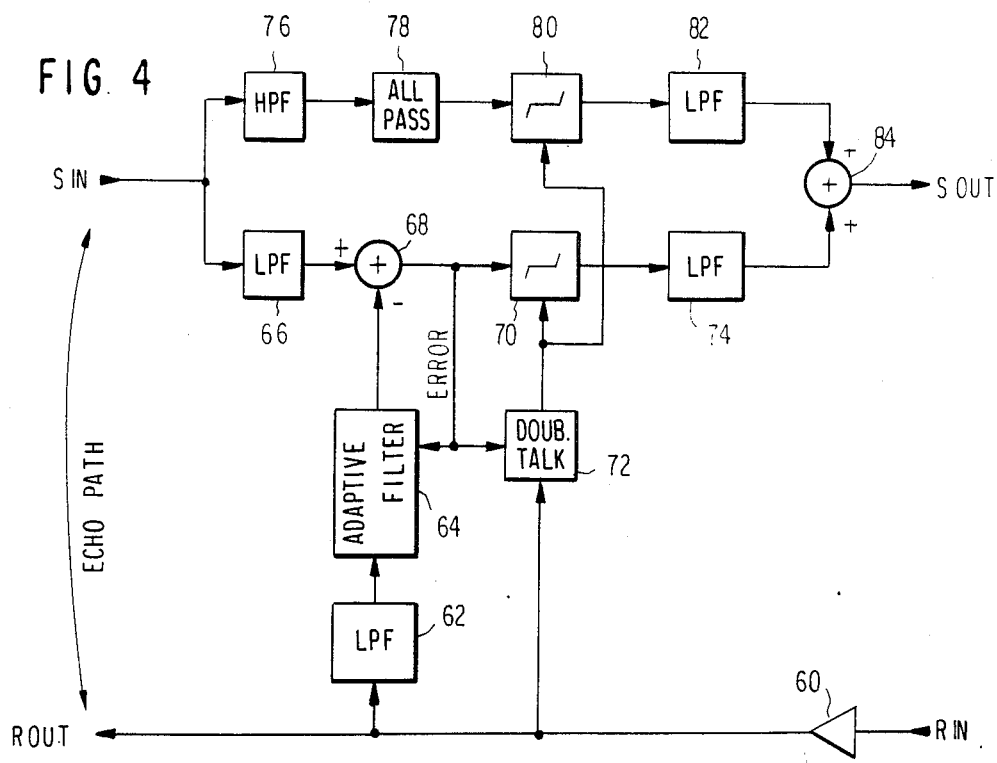
FIG. 4 is a block diagram of one embodiment of the echo canceller of the present invention.

A first embodiment of the echo canceller of the invention is illustrated in FIG. 4. The received signal $R_{IN}$ is first amplified by a receive amplifier 60 into an amplified receive signal $R_{OUT}$ which is the receive output of the echo canceller and is the input to the echo path. For a teleconferencing circuit, $R_{OUT}$ is connected to the loudspeaker 40 in the echo-producing room 44 shown in FIG. 2. The signal from the microphone 42, which contains both the intended transmitted voice signal as well as the room echo, is led into the echo canceller of FIG. 4 as a send input signal $S_{IN}$. The purpose of the echo canceller is to cancel the room echo without distorting the intended transmitted voice signal. It is to be appreciated, of course, that the invention can be used for other purposes than for teleconferencing and that its use is not restricted to acoustic echoes.

Figure 1:
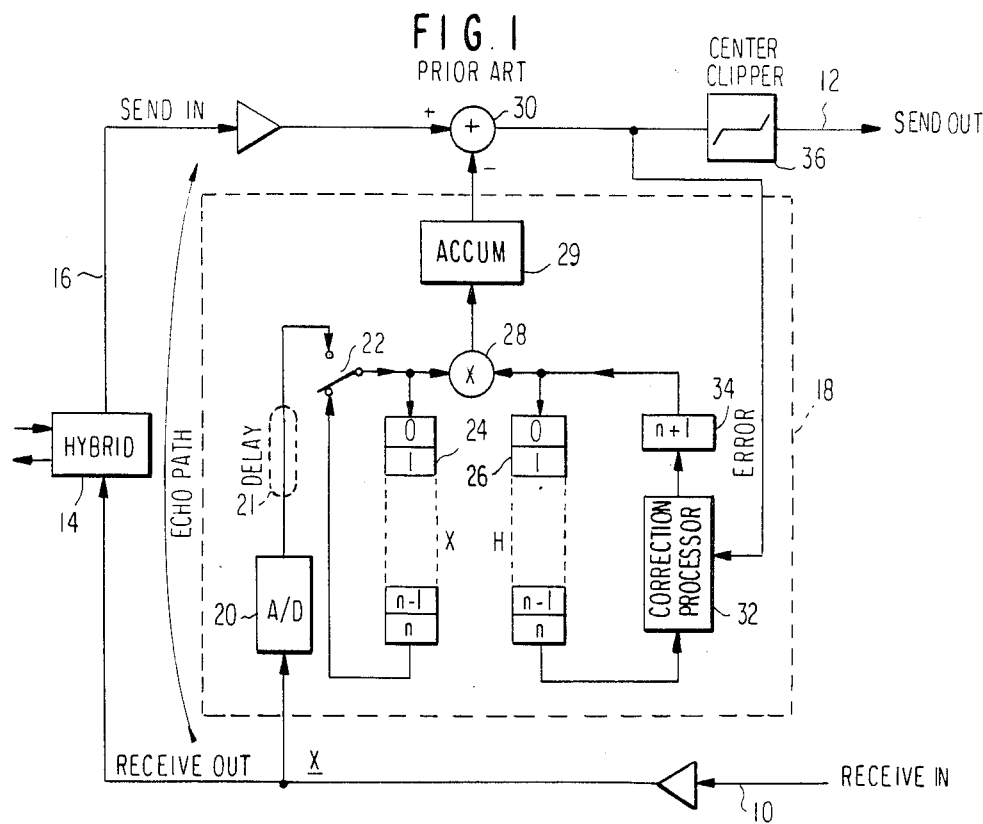
FIG. 1 is a block diagram of a conventional echo canceller.

The receive signal $R_{OUT}$ is passed through a low-pass filter 62 on the receive side of the echo canceller. The low-pass filter 62 has a corner or cross-over frequency $f_{co}$ that determines the bandwidth of the digital filtering of the echo canceller. The cross-over frequency $f_{co}$ can be between 2 and 3.5 kHz. The output of the low-pass filter 62 is led into an adaptive finite impulse response filter (AFIRF) 64. The AFIRF can have a structure similar to the AFIRF 18 in FIG. 1 or other AFIRF described in the literature, but it is not intended that the invention herein is limited to use with any particular AFIRF developed to date. The AFIRF 64 however only needs a bandwidth corresponding to the cross-over frequency $f_{co}$. The output of the AFIRF 64 is the predicted echo of the low frequency components of the receive signal $R_{OUT}$.

The send input signal $S_{IN}$, which contains both the intended transmitted signal as well as the echo of $R_{OUT}$ is led through another low-pass filter 66 having similar characteristics to the low-pass filter 62. The output of the low-pass filter 66 is connected to a non-inverting input of an adder 68 and the predicted echo from the AFIRF 64 is fed into an inverting input of the adder 68. Thus, the predicted echo of the low frequency receive signal $R_{OUT}$ is subtracted from the low frequency part of the send input signal $S_{IN}$, that is, the low frequency echo and the low frequency part of the intended transmission. In the absence of an intended transmitted signal, the output of the adder 68 is an error signal. This error signal is fed back to the AFIRF 64 so as to adapt its emulation of the echo path for its low frequency components. Means, known in the art, are preferably provided to insure that the adaptive feature of the AFIRF only respond to pure error, and not to a combination of error plus transmit side speech.

The output of the adder 68 is passed through a non-linear device 70 which can be a center-clipper. The purpose of the non-linear device 70 is to remove the residual echo which has not been cancelled by the emulated echo of the AFIRF 64. If it is a center-clipper, it greatly attenuates the low level residual echo while passing higher level intended transmissions.

If a signal is intended to be transmitted, it is contained in the send input signal $S_{IN}$ and its low frequency components appear on the output of the adder 68 at a level considerably higher than any residual echo. Such high level signals will pass through a center-clipper being used as the non-linear device 70 but will suffer distortion due to the nonlinearity. A double-talk detector 72 can be used to compare the level of the output of the adder 68 to the receive signal $R_{OUT}$. The high frequency components in the receive signal $R_{OUT}$ are usually much smaller than the low frequency components so that their inclusion does not affect the comparison. If the echo-cancelled output of the adder 68 is larger than the expected echo of the receive signal $R_{OUT}$, then the send input signal $S_{IN}$ contains an intentional signal at a fairly high level. In this case, the double-talk detector 72 disables or linearizes the non-linear device 70. This linearization removes the distortion of the intended signal by the non-linear device 70 at the same time that the high level transmitted signal is masking the residual echo. The gains of the two inputs to the double-talk detector 72 are adjusted so that a double-talk condition is indicated when the output of the adder 68 is larger than the echo of the receive signal $R_{OUT}$. Double-talk detectors are described in the previously noted U.S. Pat. No. 3,894,200 and by the present inventor in U.S. Pat. No. 4,360,712. It should be remembered that the AFIRF 64 typically reduces the echo by 20 dB so that residual echo should be very small relative to the intended signal under these conditions.

The output of the non-linear device 70 is led through a low-pass filter 74, which smoothes the signal and removes the high frequency quantization and sampling noise. It also reduces the distortion introduced by the non-linear device 70. The low-pass filter 74 should have the same corner frequency $f_{co}$ as the low-pass filter 66 but it may have different number of poles to correct phase distortions.

The send input signal $S_{IN}$ is also led into a high-pass filter 76 that has a corner frequency equal to the cross-over frequency $f_{co}$ of the two low-pass filters 62 and 66. Thus the output of the high-pass filter 76 contains the high frequency components of the send input signal $S_{IN}$ not used in the echo cancelling of the AFIRF 64. These high frequency components are passed through an all-pass filter 78.

The all-pass filter 78 is a phase adjusting filter which corrects the phase distortion and the delay introduced by the other filters without attenuating any frequency components. The details of the all-pass filter 78 will be provided later. The output of the all-pass filter 78 is passed through a second non-linear device 80, which may be a center-clipper, a switch or a switchable attenuator. The non-linear device 80 for the high frequency path is disabled by the double-talk detector 72 just as is the non-linear device 70 for the low frequency path. If the non-linear device 80 is a switch, in the absence of a high level transmit signal, the high frequency path is interrupted. A switch can be used because the high frequency path is only important for intended voice transmission. Finally, the output of the non-linear device 80 is passed through a low-pass filter 82 which limits the high frequency path to a desired frequency bandwidth, e.g. for speech usually between 5 kHz to 7.5 kHz for a commentator quality channel. The low-pass filter 82 also attenuates the distortion introduced by the non-linear device 80. The very high frequency noise should be removed to prevent overmodulation if the output $S_{OUT}$ is used to modulate a carrier.

The high and low frequency paths are recombined by connecting the outputs of the low-pass filters 74 and 82 to inputs of an adder 84, the output of which is the send ouput signal $S_{OUT}$. The send output signal $S_{OUT}$ has had echo cancellation performed on its low frequency components but has had echo suppression performed on its high frequency components only to the extent of attenuating at least the low level high frequency components.

When only an echo signal is present at the send input $S_{IN}$, the lower frequencies are cancelled in the adder 68 and the low frequency residual echo is suppressed by the non-linear device 70 in the low-pass section. At the same time, the non-linear device 82 in the high-pass section is suppressing the higher frequencies of the low level echo.

When near talker speech is present at the send input $S_{IN}$, the double-talk detector 72 disables or linearizes the non-linear devices 70 and 80. As a result, the full bandwidth speech, both above and below $f_{co}$, passes to the send output $S_{OUT}$. Any residual low frequency echo at the output of the adder 68 and any high frequency echo above $f_{co}$ are masked by the much louder near talker's speech in the double-talk condition. Thus, with or without double-talk, no echo signal is audible at the send output $S_{OUT}$.

Because the double-talk detector 72 compares the echo cancelled output of the adder 68 to the receive signal, it can distinquish a loud echo from a near speaker's speech. If center-clippers are used for both non-linear devices, a relatively soft intended transmission will pass through the center-clippers even in the presence of a loud receive signal $R_{OUT}$.

With digital filtering restricted to the lower frequency band below the cross-over frequency $f_{co}$, the sampling frequency can be reduced to the Nyquist rate of the reduced bandwidth. This allows an increased processing window with a fixed number of coefficients in the AFIRF 64. For example, with 1000 coefficients and a Nyquist sampling rate of 7.5 kHz for a cross-over frequency of $f_{co}$ equal to 3.75 kHz, the processing window is approximately 133 ms. This processing window is satisfactory even for a room that has a reverberation time $T_{60}$ no greater than 440 ms. Thus, reverberation times can be handled with values twice those allowable for prior art echo cancellers. Although the high frequency echo is suppressed rather than cancelled, because of the characteristics of human speech, no high level echo passes through the echo canceller of this invention.

The invention divides the send signal $S_{IN}$ into low-pass and high-pass bands. It is desirable that the two bands be sharply defined because the bands are treated distintcly differently. Therefore the high-pass filter 76 and the low-pass filter 66 should be designed with sharp cut-off characteristics and high attenuation for out-of-band components. Such filters with sharp cut-off characteristics are well known. However, those filters when implemented with lumped constants, introduce phase non-linearities, which cause unacceptable ripple in the bands when they are recombined. Accordingly, the high-pass and low-pass filters 76 and 66 should be carefully designed and the all-pass filter 78 is included to correct the phase non-linearities.

Figure 3:
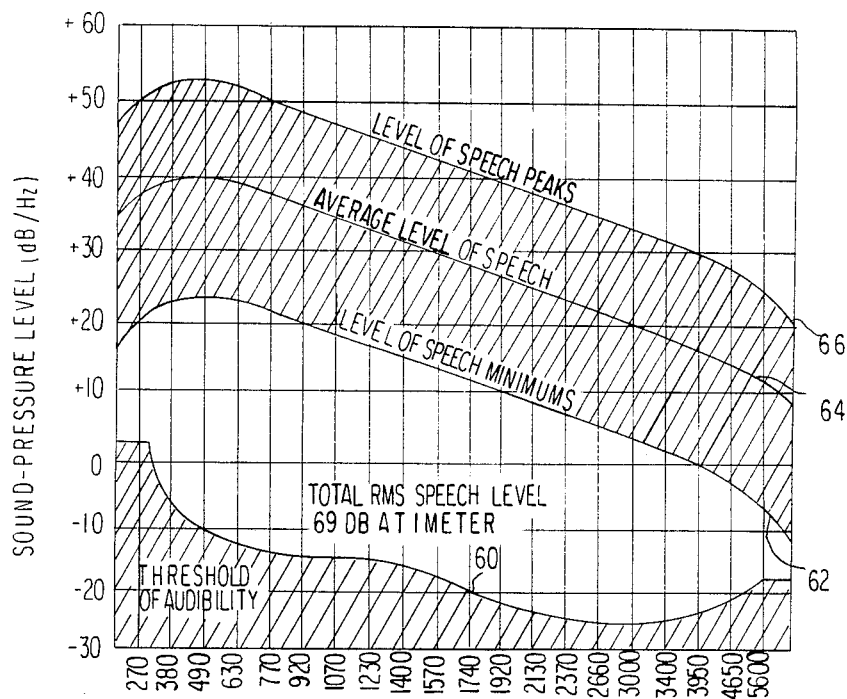
FIG. 3 is a power spectrum of human speech.
Figure 5:
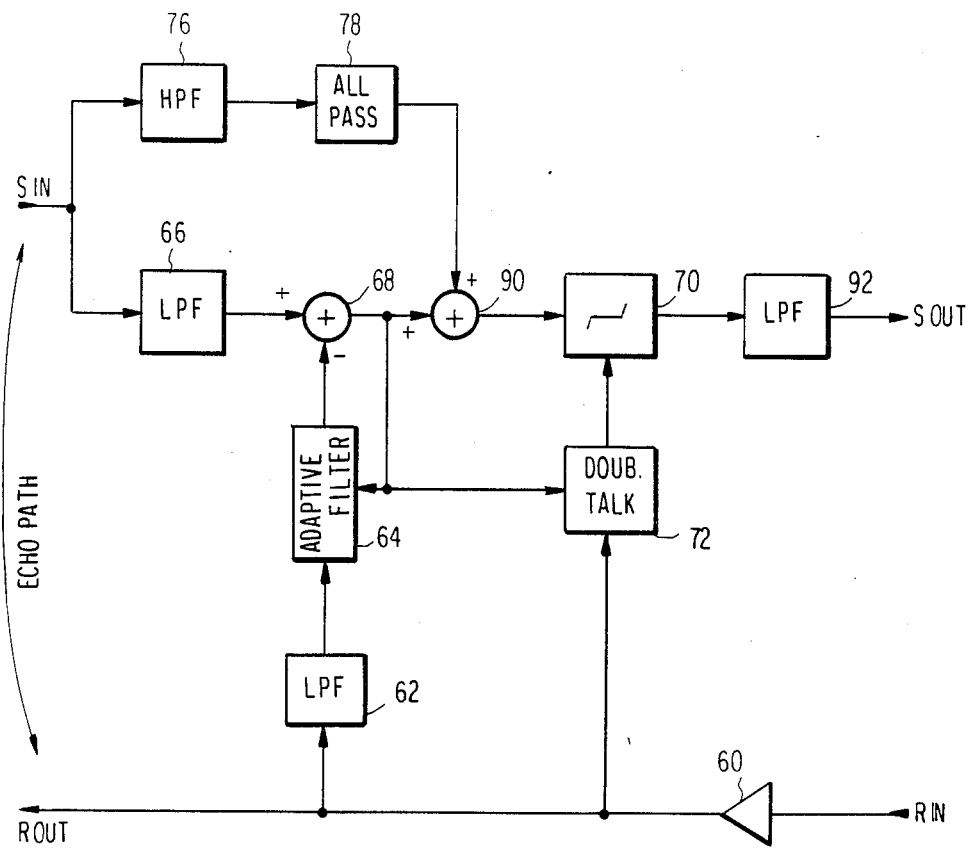
FIG. 5 is a block diagram of a second embodiment of an echo canceller of the present invention.

The filters for acoustic frequencies are preferably implemented as active filters, i.e., filters using resistors, capacitors and operational amplifiers but lacking inductors. For example, a pair of active 5-pole Chebyshev filters introduce a minimum amount of ripple around the corner frequency. Designs are presented in "Active Filter Design" by Arthur B. Williams, Artech House, Inc., Dedham, Mass., 1st ed. 1975. Such a low-pass filter is shown in FIG. 3—3a of that book and for such a high-pass filter in FIG. 3—3b. An active all-pass filter, also called a delay equalizer is shown in FIGS. 5-7 of that same book. Using these active filters for high-pass filter 76, low-pass filter 66 and all-pass filter 78 will provide an overall frequency characteristic of the recombined signal that shows substantially no ripple.

Although FIG. 4 is the preferred embodiment and has been experimentally verified, a second embodiment illustrated in FIG. 5 allows for a reduction in the number of components. In this embodiment, the high frequency signal from the all-pass filter 78 is combined with the low frequency signal from the echo cancelling adder 68 in an adder 90. The combined signal is then led to the single non-linear device 70 controlled by the double-talk detector 72. The signal is then passed through a low-pass filter 92 to form the send output $S_{OUT}$. The low-pass filter 92 should pass the entire voice bandwidth, cutting off only very high frequency noise. This embodiment, although simpler, does not allow the optimization of the non-linear device 70 and low-pass filter 92 for the separate low-pass and high-pass bands.

I claim:

1. An extended range echo canceller, for cancelling a wide frequency echo of a receive signal created across an echo path and coupled into a send line adapted to carry a near end signal, a composite signal of said near end signal and said wide frequency echo in said send line being a send signal, comprising:
   means responsive to said receive signal for generating a predicted echo signal representing a predicted low frequency echo of said wide frequency echo created across said echo path by said receive signal;
   means for dividing said send signal into a low frequency send signal and a high frequency send signal;
   means for subtracting the predicted low frequency echo from the low frequency send signal;
   means for combining an output of said subtractor means with the high frequency send signal to form a send output signal;
   means for suppressing low level components of said high frequency send signal and for suppressing low level components of said output of said subtracting means, said low level components of said output of said subtracting means being suppressed more than high level components; and
   means for disabling said suppressing means when the level of the output of said subtracting means exceeds the level of said receive signal by a predetermined amount.

2. An echo canceller as recited in claim 1, wherein said suppressing means comprises a center-clipper.

3. An echo canceller as recited in claim 1, wherein said generating means comprises:
   a first low-pass filter receiving said receive signal and having a corner frequency near a cross-over frequency; and
   an adaptive finite impulse response filter receiving an input from said first low-pass filter and an error signal from said output of said subtracting means.

4. An echo canceller as recited as in claim 3, wherein said dividing means comprises a high-pass filter and a second low-pass filter, both having a cut-off frequency near said cross-over frequency and both receiving said send signal, an output of said second low-pass filter being said low frequency send signal and an output of said high-pass filter being said high frequency send signal.

5. An echo canceller, as recited in claim 1, wherein said suppressing means for said high frequency send signal comprises a switch, said switch being closed when disabled and open when not disabled.

6. An echo canceller as recited in claim 4, wherein said suppressing means comprises a first non-linear device receiving said high frequency send signal and a second non-linear device receiving said output of said subtracting means and wherein said non-linear devices are disabled by causing them to be substantially linearized.

7. An echo canceller as recited in claim 6, further comprising means for correcting phase non-linearities introduced by said high-pass filter and said second low-pass filter.

8. An echo canceller as recited in claim 7, wherein said phase correcting means comprise an all-pass filter disposed between said high-pass filter and said first non-linear device.

9. An echo canceller as recited in claim 8, further comprising a third low-pass filter receiving an output of said second non-linear device and having a cut-off frequency near said cross-over frequency.

10. An echo canceller as recited in claim 9, further comprising a fourth low-pass filter receiving an output of said first non-linear device, and having a cut-off frequency above said cross-over frequency, and wherein said combining means adds outputs of said third and fourth low-pass filters.

11. An echo canceller as recited in claim 10, wherein said high-pass filter and said second low-pass filter are active filters.

12. A method for cancelling an echo in a send signal of a receive signal propagated across an echo path, comprising the steps of:

predicting an echo of a low-pass band of said receive signal across said echo path;

subtracting said predicted echo from a low-pass band of said send signal to form an echo-corrected low-frequency signal, said low-pass band of said send signal approximately equalling in band width said low-pass band of said receive signal;

combining a high-pass band of said send signal with said echo-corrected low frequency signal, said high-pass band being substantially outside the bandwidth of the low-pass band of said send signal;

comparing a level of said echo-corrected low frequency signal with a level of said receive signal to determine a double-talk condition; and suppressing low-level signals in said high-pass and said low-pass bands of said send signal when a double-talk condition has been determined not to exist.

13. A method as described in claim 12, wherein said predicting step comprises adaptively emulating an echo response of an impulse applied to said echo path based on said echo-corrected low-frequency signal to produce a response function and convolving said response function with said low-pass band of said receive signal.

14. A method as described in claim 12, wherein said suppressing step comprises completely blocking said high-pass band of said send signal.

* * * * *